(12) United States Patent
Duranti

(10) Patent No.: US 12,502,694 B2
(45) Date of Patent: Dec. 23, 2025

(54) SYSTEM FOR REMOVING SLAG FROM WORKBENCHES

(71) Applicant: C.F. LAMIERE DI FANTINI CLAUDIO DURANTI S. ZANNI M. & C. S.A.S., Coriano (IT)

(72) Inventor: Simone Duranti, Coriano (IT)

(73) Assignee: C.F. LAMIERE DI FANTINI CLAUDIO DURANTI S. ZANNI M. & C. S.A.S., Rimini (IT)

(*) Notice: Subject to any disclaimer, the term of this patent is extended or adjusted under 35 U.S.C. 154(b) by 116 days.

(21) Appl. No.: 18/040,750

(22) PCT Filed: Aug. 16, 2021

(86) PCT No.: PCT/IB2021/057517
§ 371 (c)(1),
(2) Date: Feb. 6, 2023

(87) PCT Pub. No.: WO2022/053893
PCT Pub. Date: Mar. 17, 2022

(65) Prior Publication Data
US 2024/0024924 A1  Jan. 25, 2024

(30) Foreign Application Priority Data

Sep. 14, 2020 (IT) .................. 102020000021694
Apr. 6, 2021 (IT) .................. 102021000008528

(51) Int. Cl.
*B08B 1/16* (2024.01)
*B08B 1/30* (2024.01)

(52) U.S. Cl.
CPC ............ *B08B 1/165* (2024.01); *B08B 1/30* (2024.01)

(58) Field of Classification Search
None
See application file for complete search history.

(56) References Cited

U.S. PATENT DOCUMENTS

| 4,482,133 A | * | 11/1984 | Bishop ................. B65H 59/381 |
| | | | 254/291 |
| 9,656,303 B2 | | 5/2017 | Hirooka |
| 2009/0184097 A1 | | 7/2009 | Klaiber et al. |

FOREIGN PATENT DOCUMENTS

| CN | 209850107 U | 12/2019 |
| CN | 110883426 A | 3/2020 |

(Continued)

OTHER PUBLICATIONS

International Search Report issued in the International Application No. PCT/IB2021/057517, date of completion of the Oct. 18, 2021, 3 pages.

*Primary Examiner* — Kaj K Olsen
*Assistant Examiner* — Pradhuman Parihar
(74) *Attorney, Agent, or Firm* — Schott, P.C.

(57) ABSTRACT

A system for removing slag from workbenches includes plates parallel to each other developed in a first main direction L, where the system includes a slag removal machine, a traction group of the machine, and a linear sliding guide for the traction group. The three elements are associated with each other in such a way that the traction group is operationally interposed between the machine and the guide, so as to drag the machine towards the guide along a traction direction L, and the traction group slides at least partially along the guide along a sliding direction W orthogonal to the traction direction L. The slag removal machine includes a tool suitable for straddling, during the traction, at least one of the plates oriented with the first development direction L parallel to the traction direction L.

11 Claims, 9 Drawing Sheets

(56) References Cited

FOREIGN PATENT DOCUMENTS

| | | | | |
|---|---|---|---|---|
| DE | 102016012897 A1 | 5/2018 | | |
| EP | 1706218 A1 | 10/2006 | | |
| EP | 3711885 B1 * | 9/2020 | ............ | B23D 79/04 |
| FR | 3089434 A1 | 6/2020 | | |
| KR | 20000019612 A | 4/2000 | | |
| KR | 20130080532 A | 7/2013 | | |
| WO | 2016077533 A1 | 5/2016 | | |

* cited by examiner

SYSTEM FOR REMOVING SLAG FROM WORKBENCHES

The present invention relates to a motorised system for removing slag from workbenches. The invention has been developed with particular reference to the removal of metal slag, but other types of slag, such as polymeric slag, are not excluded.

The invention is particularly suitable for use in association with laser cutting machines, but its application in association with any operating machine that generates slag to be removed from a workbench is not excluded.

STATE OF THE ART

The known workbenches with which the invention is adapted to interact are those typically fitted to precision laser cutting machines or the like. They comprise a series of plates with a longitudinal development direction, placed side by side and spaced apart with said longitudinal parallel directions, so as to define a series of resting surfaces all lying in one plane.

During cutting, molten slag drips onto the plates and adheres to them, altering the plane and thus the precision of the machine. After a certain limit, the alteration in the working precision is such that the workbench needs be replaced.

Alternatively, slag removal machines have been developed that can slide along the plates and clean them with special tools.

An example of such machines is known from the Applicant's previous international patent application No. PCT/IB2020/051551. This machine is very effective, but as it features manual traction it may require some strength from the operator.

Other machines for cleaning such benches are known in patent literature from EP1706218 and US2006075593.

The latter in particular attempts to provide a traction system for the autonomous displacement of the machine along the plates. However, it provides for giving the slag removal cutters also the function of traction wheels. This limits the possibility of choosing the removal tools, so this system is not applicable to any machine, moreover it requires that the orientation of the cutters is only on axes that are orthogonal to the longitudinal direction of the plate, thus preventing an orientation that "pulls" the machine downwards for a greater slag grip. But the main drawback of the traction system described is that it requires a laborious displacement of the machine from one plate to another, in fact it is necessary to manually lock the machine on the initial side of the plate and unlock it when it has arrived on the opposite side in order to displace it onto the adjacent plate.

Alongside the specific problems of the known machine, it can be noted that a cleaning system with a motorised traction system must respect the overall dimensions of the laser cutting machine, which includes cutting heads and groups supplying parts from automatic loaders etc. around and above the bench.

It is therefore clear that when not in use the slag removal system must not prevent the operation of the members from the operating machine it has cleaned.

An object of the present invention is to completely or partially overcome the problems of the prior art.

A preferred object of the present invention is to provide a motorised system for removing slag from workbenches which is motorised and which is compatible with various types and inclinations of slag removal tools.

A further preferred object of the present invention is to provide a motorised system for removing slag that can be operated by an operator standing on only one side of the workbench.

A further preferred object of the present invention is to provide a motorised system which respects the overall dimensions of the operating machine associated with the bench and does not hinder the operation thereof when cleaning is finished.

Another further object of the present invention is to provide a motorised system with a reliable supply.

Another further preferred object of the present invention is to provide an easy-to-use motorised system.

General Introduction

According to a first general aspect thereof, the present invention relates to a system for removing slag from workbenches comprising a plurality of plates (21) side by side parallel to each other in a first main development direction L thereof, wherein the system comprises a slag removal machine (5), a traction group (10) of the machine (5), a linear sliding guide (15) for the traction group, wherein said three elements are associated with each other in such a way that:

the traction group (10) is operationally interposed between the machine (5) and the guide (15), so as to drag the machine (5) towards the guide (15) along a traction direction L, and the traction group (10) slides at least partially along the guide (15) along a sliding direction W orthogonal to the traction direction L, wherein the slag removal machine comprises tool means suitable for straddling, during said traction, at least one of said plates (21) which is oriented with said first development direction L parallel to said traction direction L.

In general, it is preferable that said group (10) comprises at least one traction cable (25), at least one winch (50) for winding said cable (25) and skid means (56) for the sliding association of the winch to the linear guide (15).

According to some preferred embodiments the winch is supported by the machine (5) and said skid means (56) are slidingly supported by the guide (15), the winch (50) and the skid means being connected to each other by the traction cable 25. In this way, the winch drags the machine with it towards the skid means placed on the sliding guide.

According to some alternative embodiments, said winch is slidingly supported by the sliding guide (15) by means of skid means, and is connected to the machine (5) by means of said traction cable (25) in order to pull it to itself.

According to some preferred embodiments of the invention the winch (50) comprises at least one reel for winding the traction cable (25) of the machine (5).

Preferably, the winch (50) and the machine (5) are connected to each other by a towing cable (25) and by a control line (52) of motor means (54) of the winch (50), which are simultaneously windable by the winch (50).

In such a case, preferably the control line supplies motor means (54) of the winch (50), and is in turn supplied by means of a supply line (52*b*) connected to the machine (5), wherein the winch (50) is controlled by means of controls (51) that are arranged on the machine (5).

Preferably, the winch (50) comprises at least two reels (55, 60) for simultaneously winding the traction cable (25) of the machine and the control line (52).

In such a case, preferably the reels (55, 60) comprise respective grooved surfaces with respective spiral seats for housing the traction cable (25) and the control line (52) respectively, further the traction group comprises respective shaving elements (68, 69) which during the rotation keep the traction cable (25) and the control line (52) inside the spiral seats (65 and 66), the reels are preferably counter-rotating.

According to some possible embodiments, the winch (50) and the machine (5) are connected to each other by a towing cable (25) and the winch (10) is connected to a control line (52) of motor means (54) wherein only the traction cable is wound by the winch (50), while the control line (52) remains outside the winch (50) and connects the winch (50) with a control that is separate from the machine (5), for example a foot control, or with the machine (5) itself.

Preferably the winch (50) is connectable and disconnectable to the machine (5) and is reclinable with respect to the linear sliding guide (15).

In general, preferably the traction group (10) has at least one non-operational condition in which it allows manual unwinding of the cable (25) for the manual distancing of the machine (5) in the opposite direction to the towing direction. For example, the group comprises pneumatic motor means arranged to move at least one reel of the winch to wind said cable (25), wherein in a non-operational condition the motor means allow the rotation of the reel to be reversed by manually pulling the cable to unwind it.

According to some preferred embodiments, the group comprises pneumatic motor means arranged to move at least one reel of the winch to wind said cable (25). This generally makes the adaptation to the opposition offered by the slag possible.

Preferably, the machine (5) comprises a handlebar (43) on which there are:
  controls (51) for operating the traction group (10);
  controls (48) for operating tool means (35) of the machine (5);
  at least one supply connection (49) between at least one supply line external to the system (49, 52b) and the tool means (35)
  at least one supply connection (52b) between at least one external supply line and the traction group (10).

According to a second general aspect thereof, the invention relates to a process for removing slag from workbenches comprising plates parallel to each other, wherein the process comprises the following steps:
  providing a system according to any one of the preceding claims;
  providing a bench (20) to be cleaned with the sliding guide (15) at one end thereof and in a position orthogonal to the longitudinal development direction L of the plates (21).
  providing the traction group (10) on the guide (15) positioning the machine (5) astride at least a first plate (21), at one distal end with respect to the sliding guide (15);
  operating tool means (35) of the machine (5) and while they are in operation, operating the traction group (10) to displace the machine (5) along the plate (21);
  when the machine (5) reaches the end of the plate (21) proximal to the sliding guide (15), stopping the traction and bringing the machine (5) back (e.g., by pulling it manually to unwind the cable) by displacing it onto an adjacent plate (21);
  aligning the traction group (10) with the new plate to be cleaned by sliding the traction group (10) onto the linear sliding guide (15).

DETAILED DESCRIPTION

Further characteristics and advantages of the present invention will become clearer from the following detailed description of preferred embodiments thereof, with reference to the appended drawings and provided by way of an indicative and non-limiting example. In such drawings:

FIG. 1 schematically represents a system according to the present invention for removing slag from workbenches;

Figure 1:
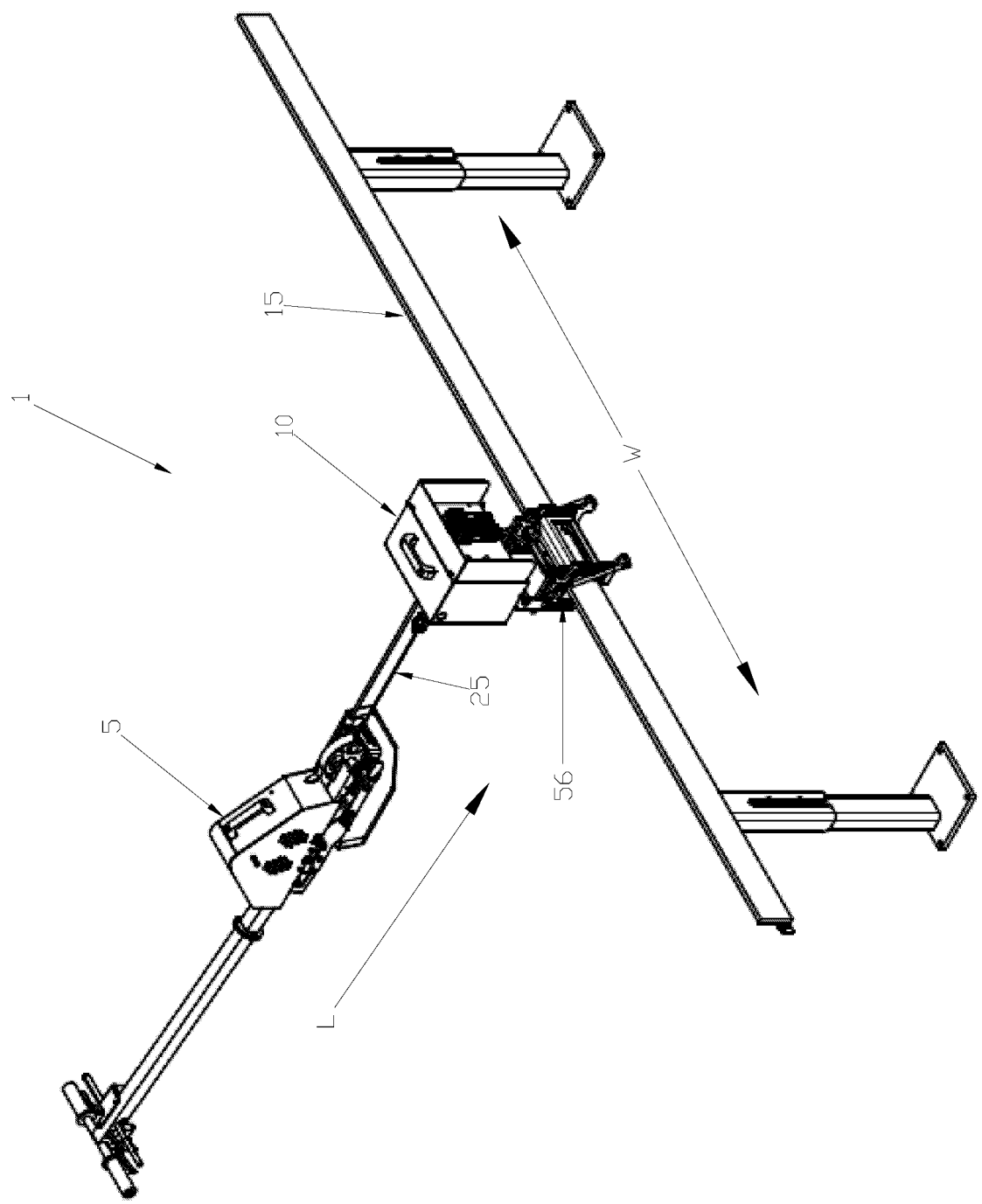
Figure 2:
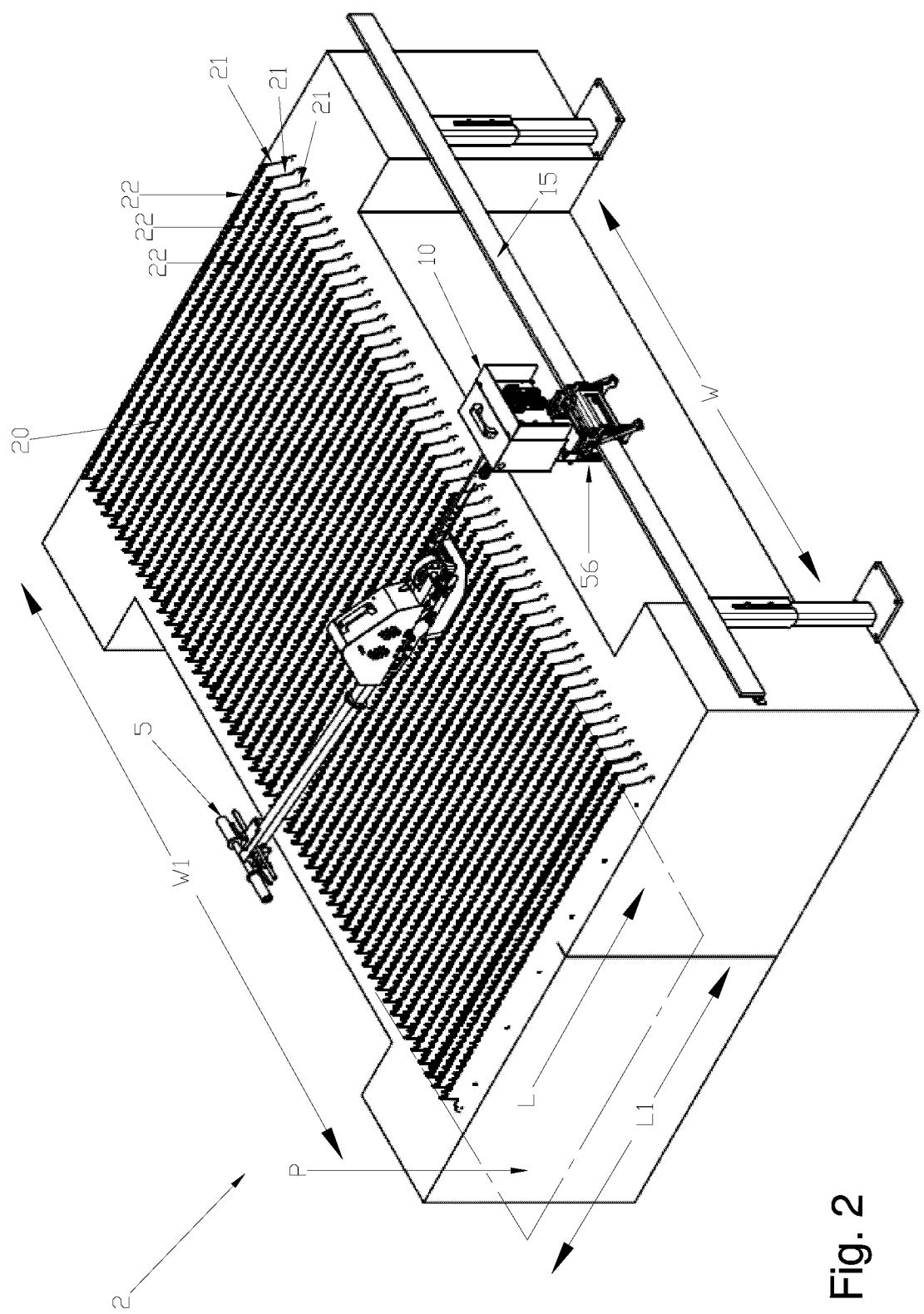
FIG. 2 represents the system of FIG. 1 while interacting with a workbench.
Figure 3:
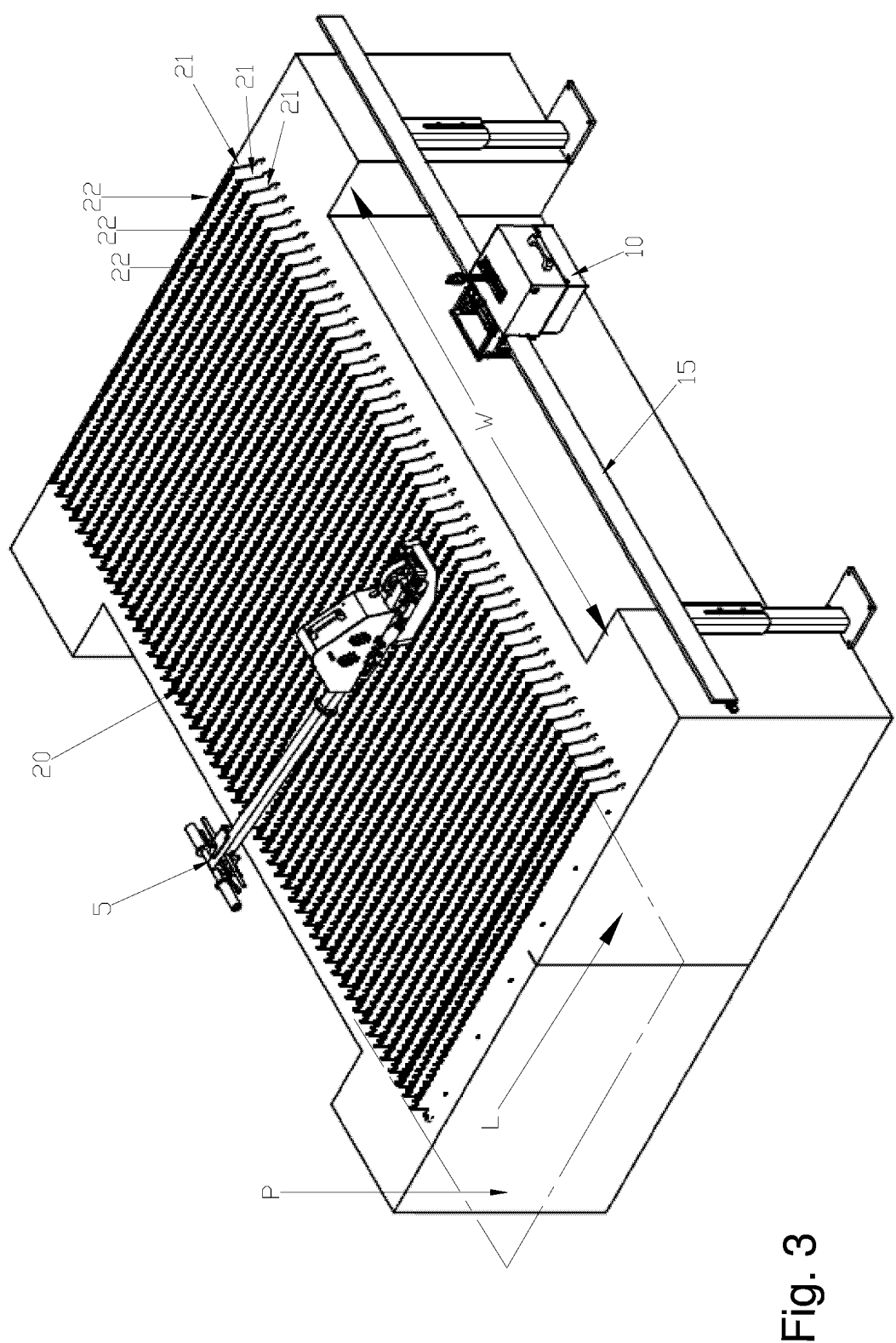
FIG. 3 represents the system of FIG. 1 associated with the bench of FIG. 2 in an end-of-work configuration in which the traction group is reclined.
Figure 4:
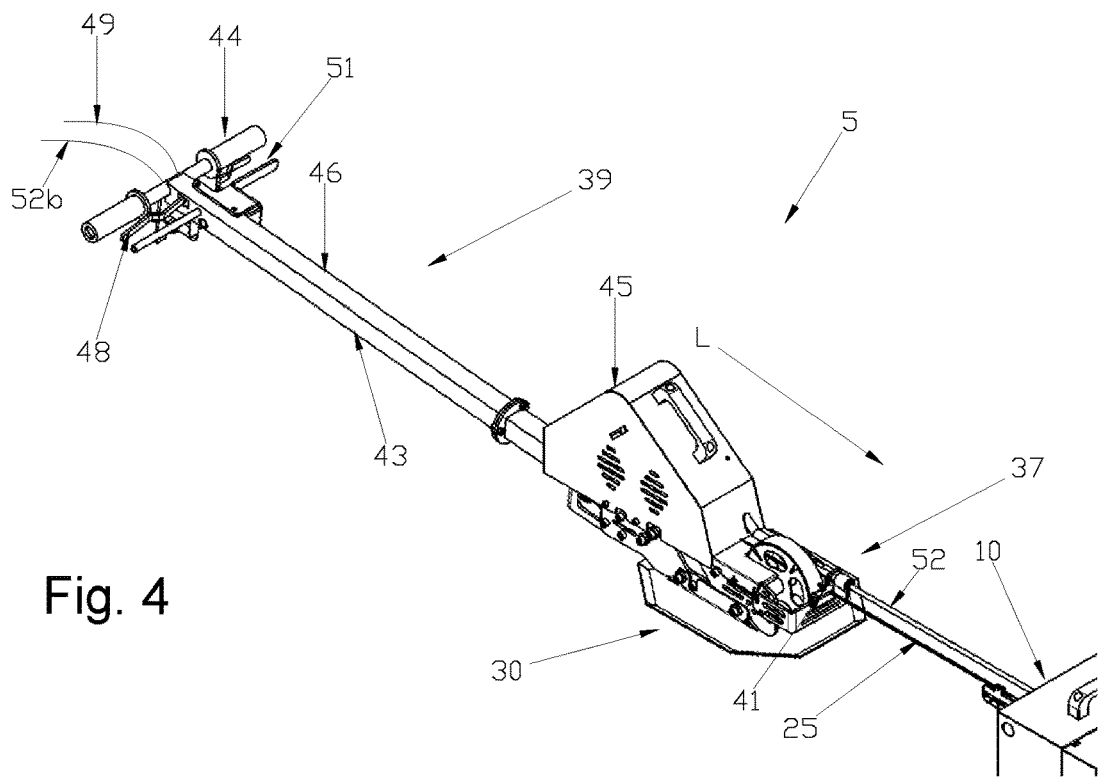
FIG. 4 represents a schematic perspective view of the machine for removing slag of the system of FIG. 1.
Figure 5:
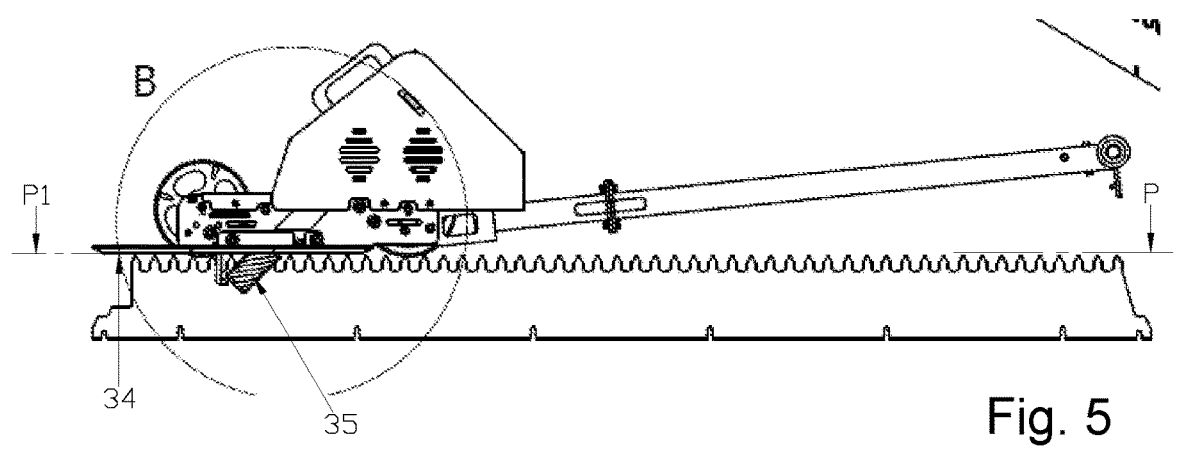
Figure 6:
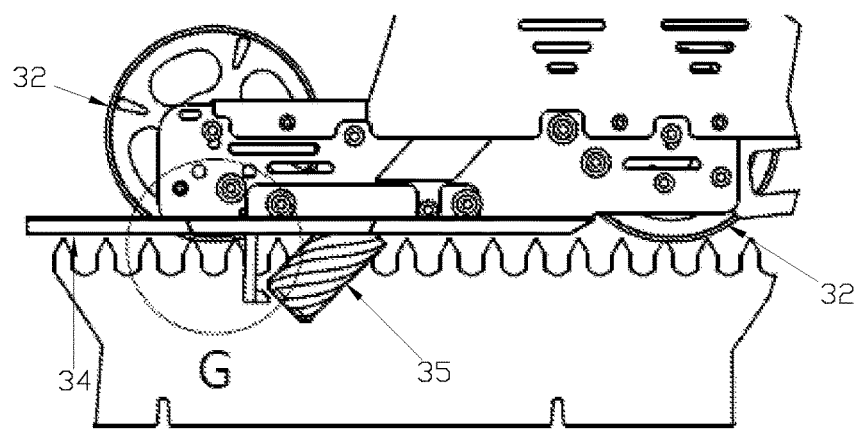
Figure 7:
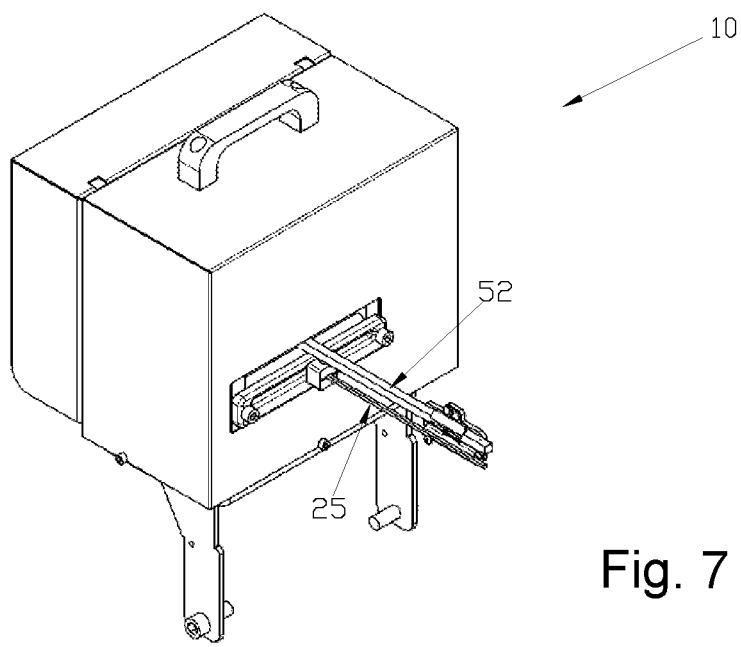
Figure 8:
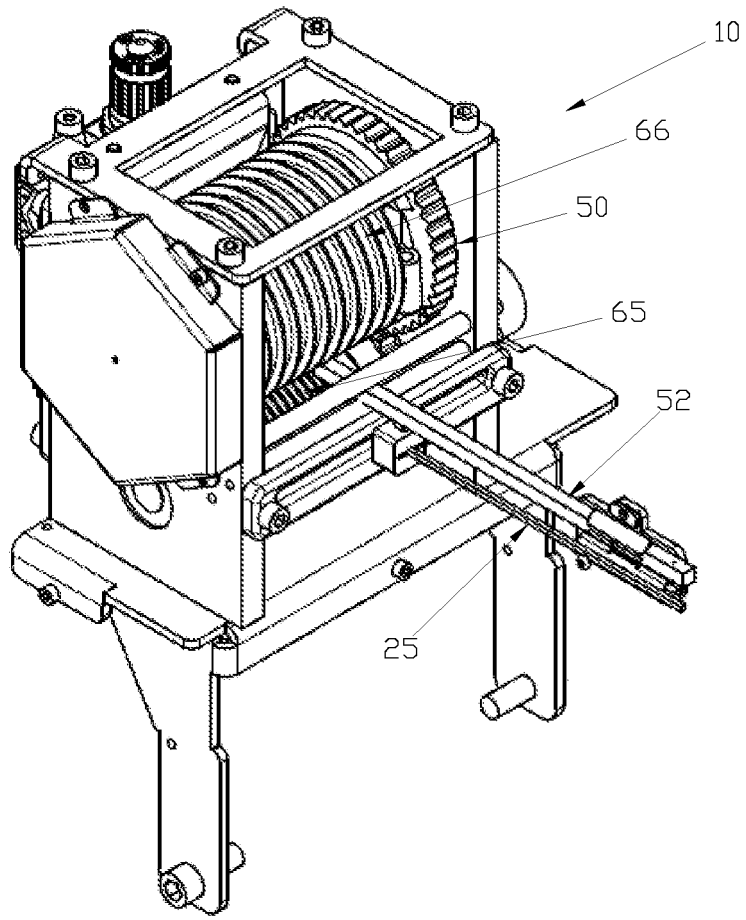
Figure 9:
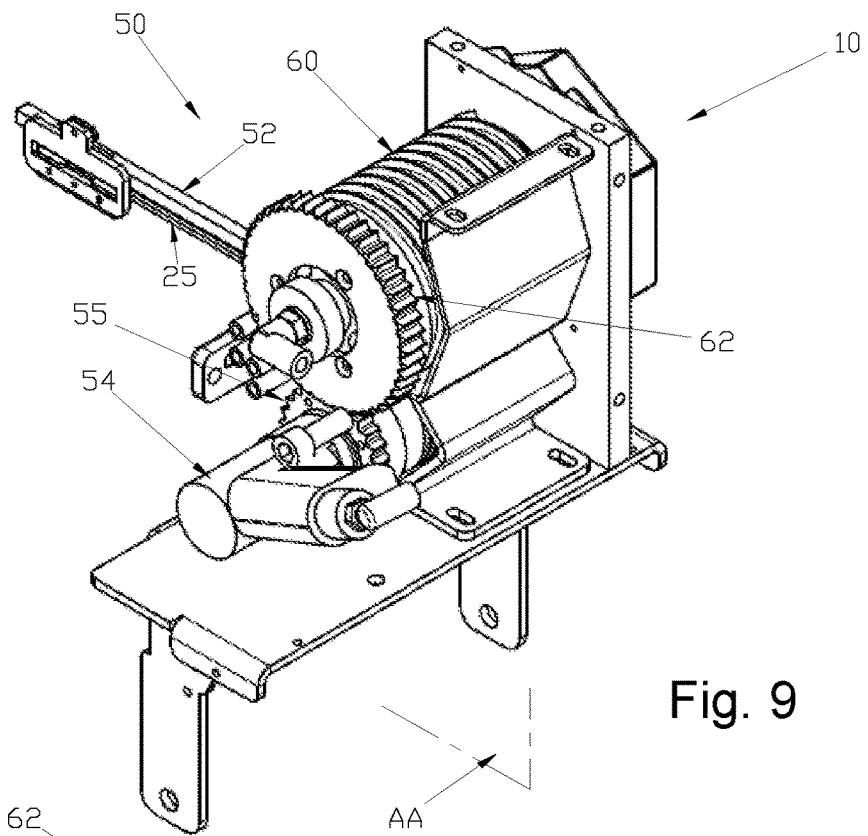
Figure 10:
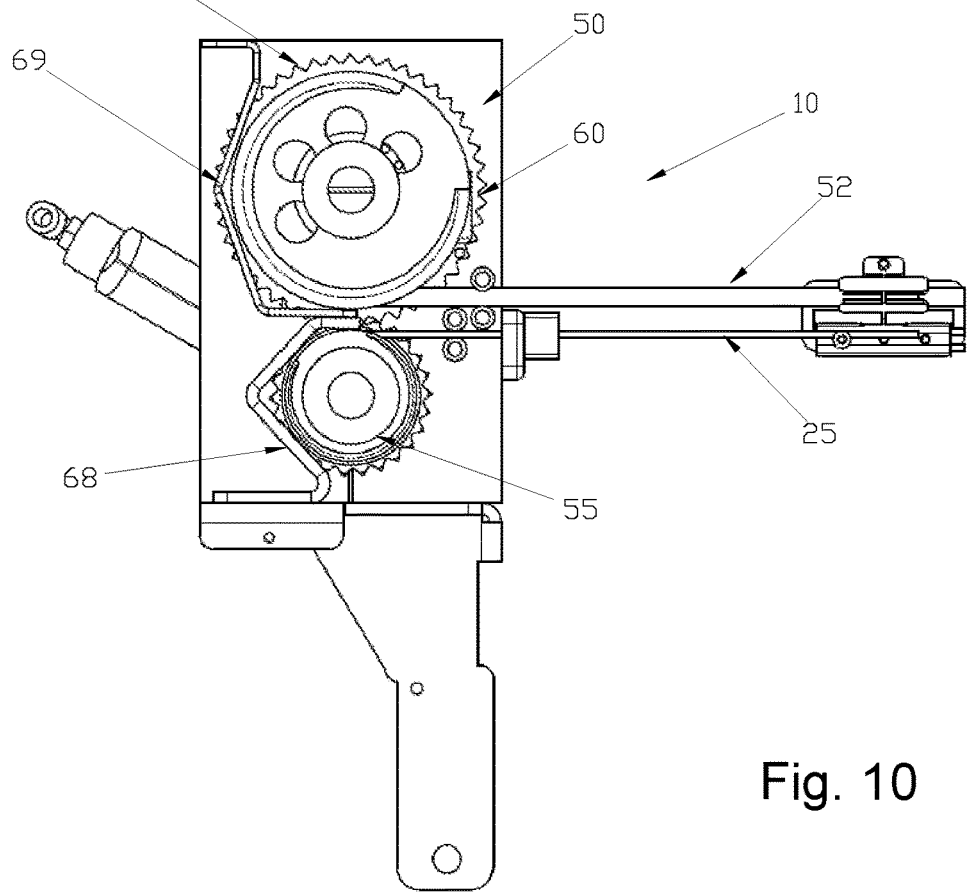
Figure 11:
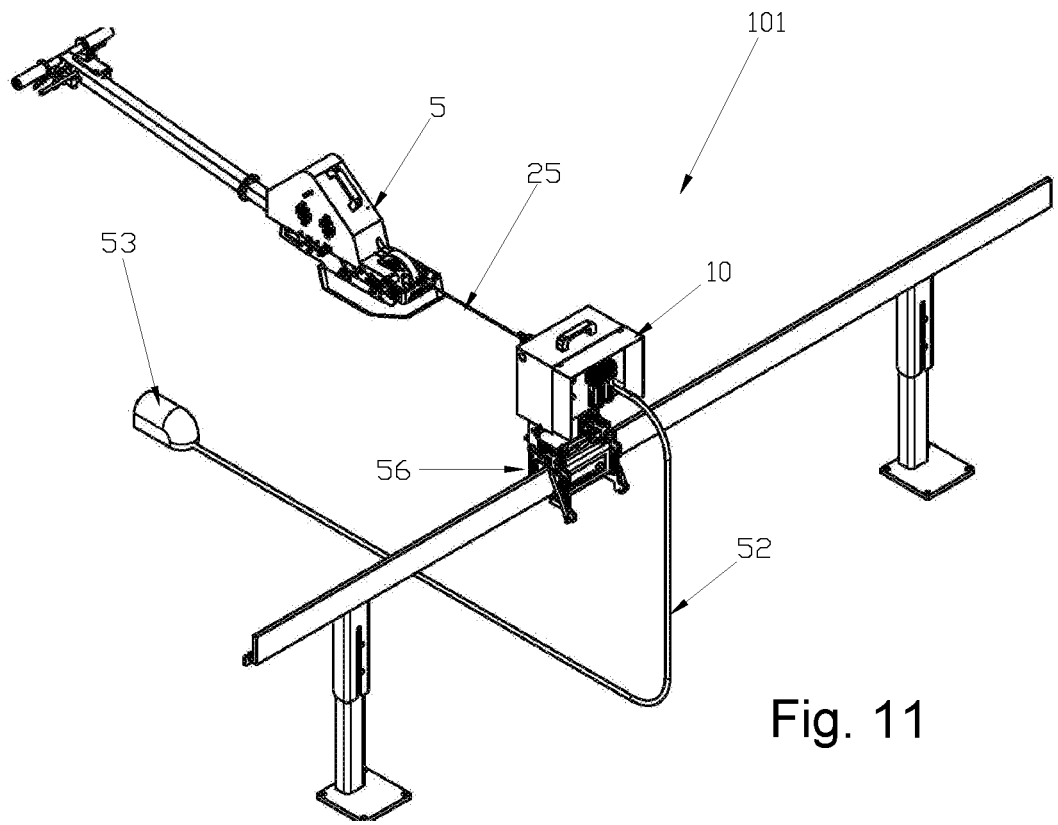
Figure 12:
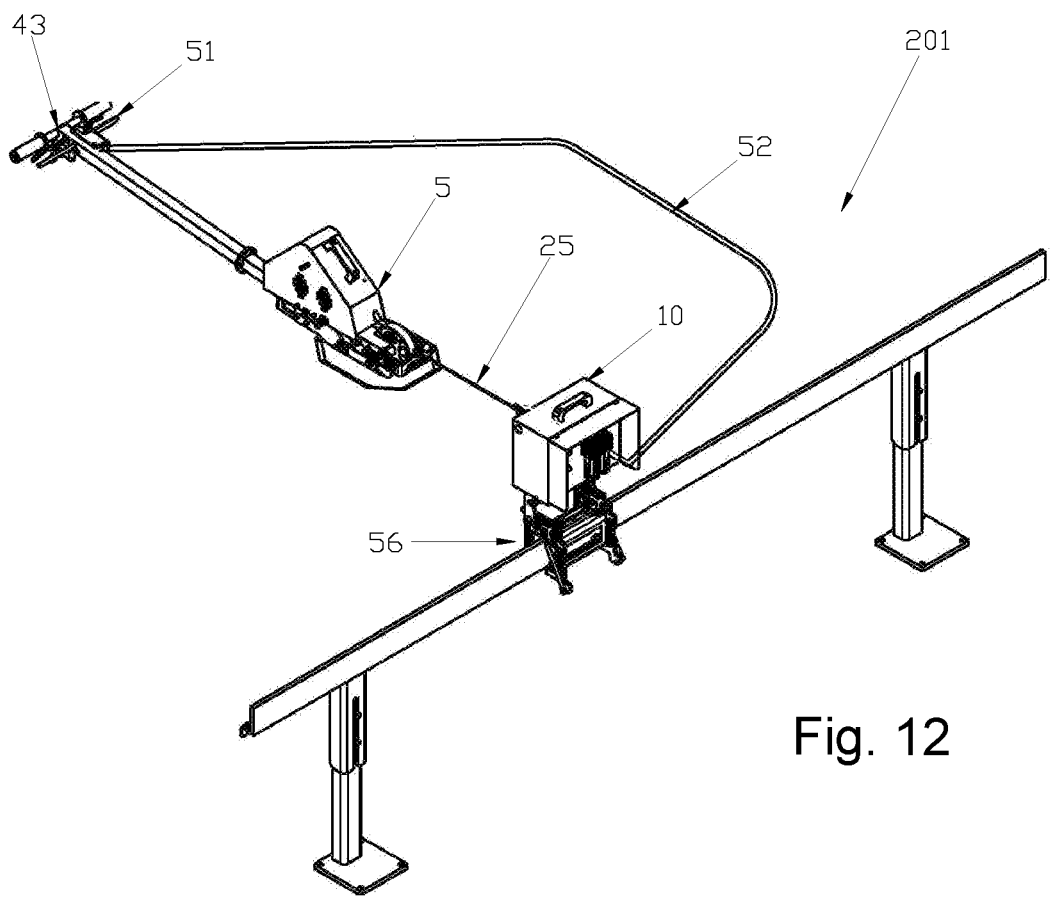
Figure 13:
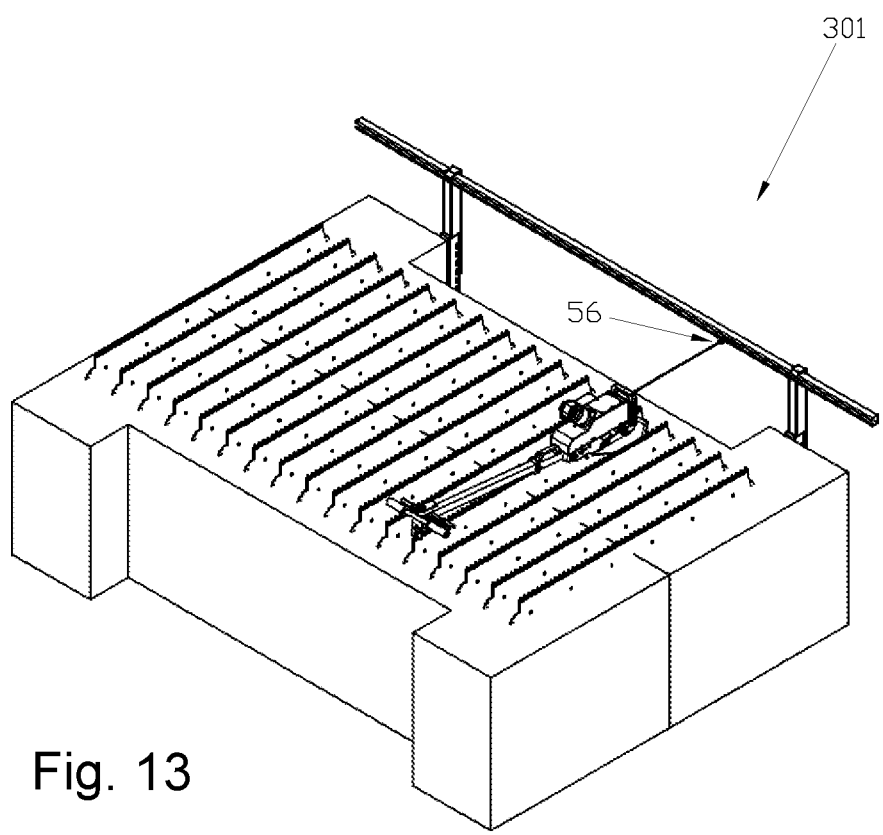
Figure 14:
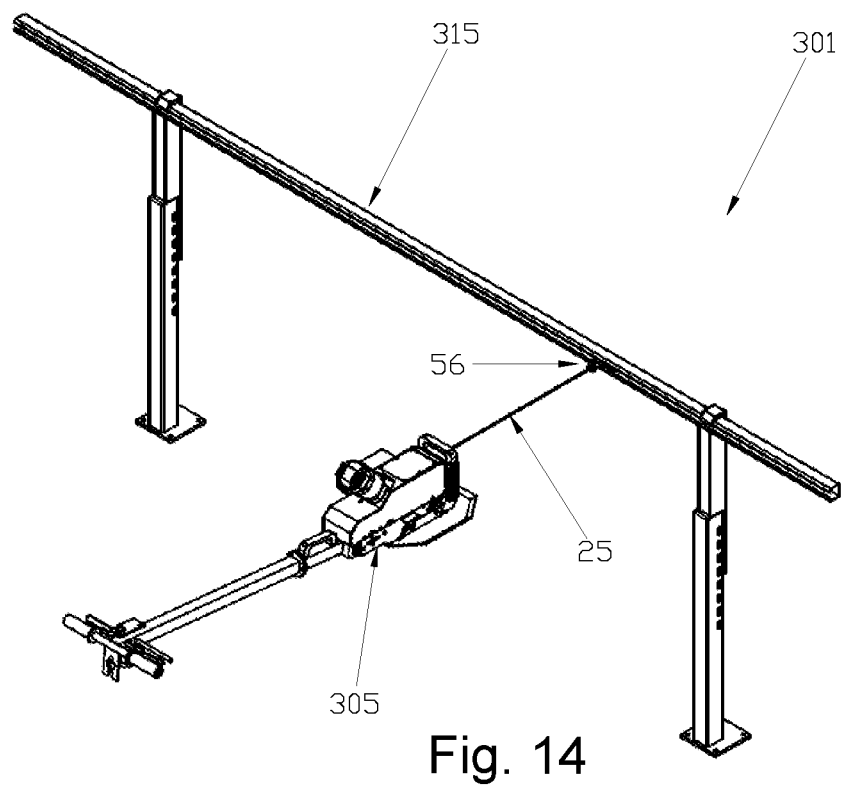
Figure 15:
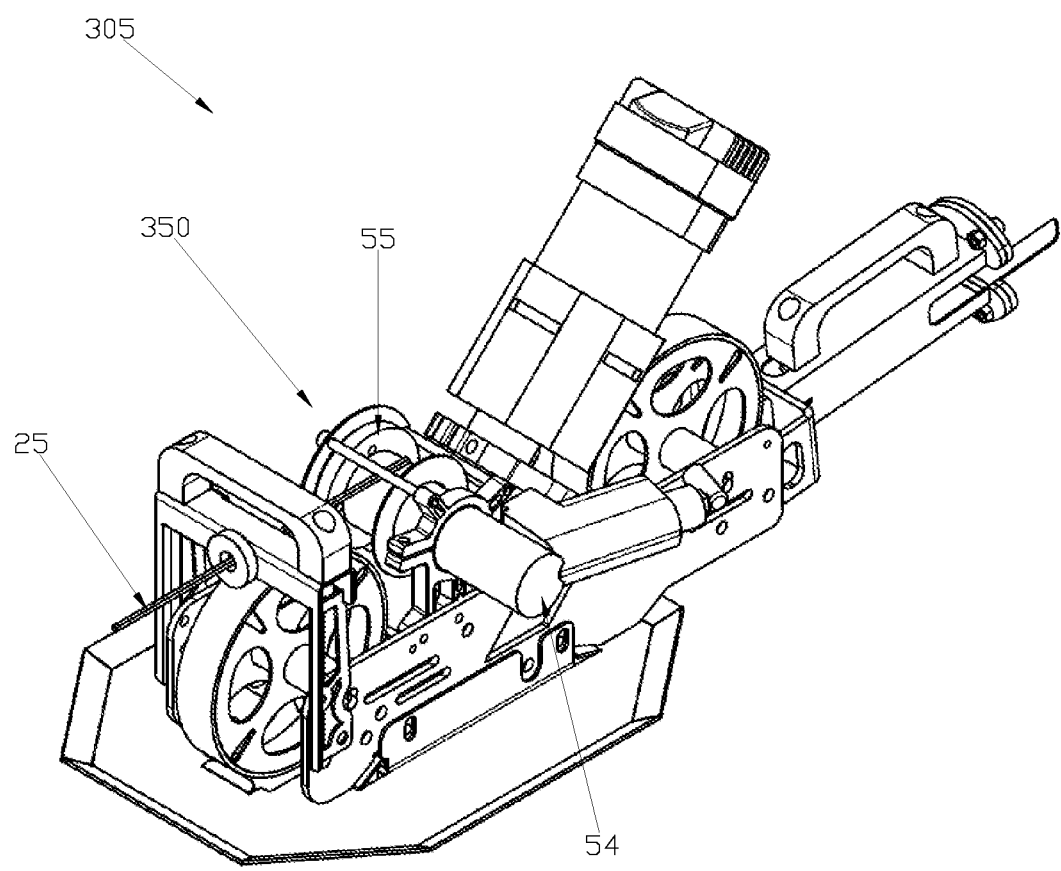

FIG. 5 schematically represents the machine of FIG. 4 in side view while interacting with a plate of the bench of FIG. 2;

FIG. 6 is a detail on an enlarged scale of FIG. 5 showing the slag removal tool while acting on the plate;

FIG. 7 represents a schematic perspective view of the traction group of the system of FIG. 1;

FIG. 8 represents the group of FIG. 7 where the protective casing has been removed to show the internal members;

FIG. 9 differs from FIG. 7 in that the perspective has a different point of observation and other details of the frame have been removed to better show the meshing between the internal cable-winding and hose-winding reels;

FIG. 10 is a section of FIG. 9 along the plane AA;

FIG. 11 schematically represents a system according to a first alternative embodiment of the invention;

FIG. 12 schematically represents a system according to a second alternative embodiment of the invention;

FIG. 13 schematically represents a system according to a third alternative embodiment of the invention, applied to a workbench;

FIG. 14 represents the system of FIG. 13 without the workbench;

FIG. 15 represents the slag removal machine 5 of the system of FIGS. 13 and 14, where the machine is shown without the casing to show the internal components.

With reference to FIG. 1, a system for removing slag from workbenches according to the present invention is shown, indicated as a whole with the reference number 1 and hereinafter referred to briefly as "the system".

The system 1 comprises a slag removal machine 5, hereinafter referred to as "the machine" for short, a traction group 10 of the machine 5, a linear sliding guide 15 for the traction group.

The traction group is operationally interposed between the machine 5 and the guide 15, so as to drag the machine 5 towards the guide 15 along a traction direction L coinciding with the working direction of the machine, which in turn is destined to coincide with the longitudinal development direction of the plates 21 of the bench, described below.

The traction group slides along the guide 15 along a sliding direction W orthogonal to the traction direction L.

In general, traction group 10 allows the manual distancing of the machine in the opposite direction to the towing direction.

For example, the traction group 10 draws the machine 5 towards the guide 15 by winding a towing cable and allows the distancing thereof by unwinding the cable 25, as will be explained later.

In general, the traction group is free to displace itself in both directions of the sliding direction W of the guide 20, for example being able to be displaced manually.

With reference to FIG. 2, the association of the system 1 to a workbench 20 to be cleaned is shown, wherein said association is generally indicated by reference number 2.

The workbench 20 comprises a series of plates 21 with a prevalent longitudinal development in the direction L, which are arranged parallel and spaced apart to define, with their vertically facing sides 22, a horizontal working plane P.

Preferably said sides are toothed.

The bench 1, in the plane P, has a length L1 and a width W1.

As can be understood from the previous hints, the system 1 is associated with the bench 20 in such a way that the traction direction L coincides with the longitudinal development direction L1 of the plates 21, and the sliding direction W coincides with the width direction W1 of the bench.

The winding and unwinding extent of the traction cable 25 is at least equal to the length L1 of the bench and the length of the guide 15 is at least equal to the width of the bench W1.

Preferably the sliding guide 15 is permanently associated with the bench 20, at a level below the plane P.

The traction group 10 may preferably assume at least two positions on the sliding guide 15, namely a working position in which it keeps the towing cable above the plane P, and a rest position, in which it is reclined and the entire traction group lies at a level below the plane P. In this way, even if the guide and the working group are permanently associated with the bench, they do not hinder the displacements of a tool machine when not in use.

The machine 5 can be preferably coupled and uncoupled to the traction group, for example by simple hooking and unhooking the traction cable 25.

With reference to FIGS. 4, 5 and 6, the machine comprises a main body 45 provided with resting means 30 for resting on the vertically facing sides 22 of the plates 20, so as to define an ideal sliding plane P1 on the plane P of the bench. The resting means comprise for example a pair of wheels 32, which resting means are aligned with each other so as to roll on the vertically facing side 22 of a single plate 21. Preferably, the resting means 30, in addition or as an alternative to the pair of wheels 32, comprise a resting surface 34 facing vertically downwards capable of resting on the vertically upwards facing sides 22 of more than one plate 21.

The machine 5, below the sliding plane P1, comprises slag removal tool means 35. The tool means preferably project downwards so as to straddle a single plate 21 on two sides in the horizontal direction that is orthogonal to the traction direction L. For example, the tool means comprise at least one pair of cutters and/or one pair of knives, but any other means suitable for the removal of slag from said two sides is contemplated. In general, the tool means 35 form a passage seat of a single plate 21. Preferably the seat is adaptable to the thickness of the plate so that the tools interact with it, for example this can be achieved by opposing mobile jaw cutters to clamp the plate 21 together.

In general, the machine 5, in the advancement working direction in the direction L, comprises a front part 37, intended to face the linear guide 15, and a rear part 39.

In the front part 37 there is a coupling 41 to the towing cable 25, where their union is preferably removable, being for example of the slot/hook type.

In the rear part 39 there is a handlebar 43 with a distal manual grip portion 44 so as to be preferably placed at a predetermined distance from the main body in the advancement direction L. For example, the grip portion comprises a pair of knobs 44 connected to the body 45 of the machine by means of a spacer rod 46 with a prevalent development in the advancement direction L.

The handlebar 43 also comprises means 48 for controlling the tool means 35. For example, they comprise one or more levers arranged adjacent to the knobs 44.

In a preferred example, the tool means comprise motor means, for example electric ones, for example capable of carrying out the rotation of the pair of cutters or the movement of the knives, operated by means of said lever 48. Any power supply may be provided, for example, by means of a power supply cable 49 connected to the handlebar 43, preferably at the distal end thereof. At this point the supply cable can preferably be connected and disconnected, e.g., by means of a plug and socket connection.

With reference to FIGS. 7, 8, 9 and 10, the traction group 10 generally comprises a winch 50, the traction cable 25 and skid means 56.

The winch 50 is at least controllable for winding the towing cable 25 and is slidingly supported in the direction W on the guide 15 by means of the skid means 56.

For unwinding the cable, the winch is generally preferably left free to rotate in the opposite direction to the winding direction in response to a manual traction of the cable.

The winch 50 is preferably controlled at least for the winding of the cable 25 by means of control means 51 that are arranged on the handlebar 43 of the machine and connected to the traction group 10 by means of a control line 52 which controls the machine 5 and is parallel to the towing cable 25, where it is also wound by the winch. The control means 51 for example comprise a second lever.

The control line 52 is preferably supplied from a source of compressed air that is external to the system by means of a supply section 52b connected to the distal end of the handlebar 43, for example by means of a pneumatic quick coupling.

The control means 51 generally control both the winding of the cable 25 and the release of the winch to allow a manual unwinding by simply pulling backwards the machine 5.

The winch comprises motor means 54, preferably pneumatic ones, so that the control line 52 is a pneumatic line. However, other types of motorisation, such as oleodynamic or electric one, are not excluded. The latter example, however, is less preferred since the electric motor in this case must comprise a clutch to adapt to possible slowdowns due to particularly encrusted and stubborn spots to be cleaned. In contrast, the pneumatic motor means 54 allow a simplification as they adapt autonomously to the resisting forces that oppose the advancement of the machine 5.

As can be seen better in FIGS. 9 and 10, the winch 50 comprises a pair of counter-rotating reels, in particular a cable-winding reel 55 and a hose-winding reel 60.

One of the two reels is preferably connected to the motor means 54 while the other is driven into counter-rotation by the first one by means of drive means 62, for example with gears.

The winches preferably have grooved winding surface according to spiral seats 65, 66 capable of accommodating the traction cable 25 and the control line 52, respectively.

The reel comprises respective shaving elements 68, 69 which during the rotation keep the traction cable 25 and the control line 52 inside the spiral seats 65 and 66. This avoids chaotic windings that can generate winding or unwinding jams.

Alternative embodiments of the invention are described below where same or similar elements to those described above will be indicated with the same reference numbers or with the same numbers increased by 100 or multiples thereof.

In general, embodiments are contemplated in which the control line 52 is independent of the machine 5 and is not wound around the winch.

FIG. 11 shows a first example of this type in which the system is indicated as a whole with the reference number 101.

The system 101 differs from the system 1 of the previous figures in that the control line 52 controls a foot control 53 that is separate from the machine 5. In this case, therefore, the control lever 51 on the handlebar 43 is absent.

This solution is ideal when a simple and cost-effective system is required, but is less preferred than the previous one, as the control line 52, since it is not wound in the winch, remains free in a dirty environment with potential sharp points, and moreover it can cause jams.

FIG. 12 shows a second alternative embodiment, indicated as a whole as system 201, which differs from the system 1 in that the control line 52, while continuing to control the machine 5, is not wound by the winch, but it reaches the traction group 10 remaining permanently free outside it.

The solution is as economical as the one 101, but more convenient as it can be controlled by the handlebar.

Naturally, all the combinations between the systems 1, 101 and 201 are also contemplated, such as for example a pedal control 53 which controls the machine 5 from which the control line 52 for the traction group (10) departs.

In both systems 101 and 201, the winch 50 does not need to have two reels, but it can only have one reel for winding the towing cable 25. In this case it is preferable that the reel is spirally grooved and that there is a corresponding shaving element as described for the system 1.

In use, the bench 20 to be cleaned is provided with the sliding guide 15 at one end thereof and in a position orthogonal to the longitudinal development direction L of the plates 21. The traction group 10 is then provided on the guide 15 and the machine 5 is positioned astride a first plate 21, at a distal end with respect to the traction group 10.

At this point, while the tool means 35 are in operation, the winch is operated to displace the machine along the plate 21. When the machine 5 reaches the end of the plate 21 proximal to the traction group 10, the winch 50 stops and the cable 25 and the control line 52 are unwound by manually pulling the machine 5 backwards and by displacing it onto an adjacent plate 21. The tension of the towing cable 25 is sufficient to displace the traction group 10 in front of the new plate to be cleaned by sliding on the guide 15. In this way, advantageously, the whole bench can be cleaned by an operator standing in front of a single side of the machine. Machines of different widths capable of cleaning more than one plate at a time are not excluded.

At the end of cleaning, the machine 5 is disconnected from the winch, e.g., by unhooking the towing cable 25 and the control line 52. The winch 50 can be removed or remain associated with the guide 15 in a reclined position below the working plane P while waiting for the next use.

Generally, the system 1 may be totally removable from the bench 20, in order to be applied to other benches, or remain partially applied thereto. In addition to the case already mentioned in which both the traction group 10 and the sliding guide 15 remain associated with the bench, there is also provided a case in which only the guide remains, as in this way the traction group 10 may be used for cleaning benches of various machines, each provided with its own sliding guide 15 to which the traction group 10 can be associated.

Referring now to FIGS. 13, 14 and 15, a third embodiment of the invention, indicated as a whole under reference number 301, is illustrated, characterized by a different arrangement of the elements of the traction group 10. In particular, the winch 350 and the motor means thereof 54 are supported by the machine 305 instead of by the sliding guide 15. Therefore, instead of remaining on the guide 15 and drawing the machine to itself, the winch remains on the machine and drags it with it towards the guide 15.

Preferably the winch can have only the reel 55 for winding the cable 25.

The skid means 56 naturally remain associated with the guide to provide a sliding anchorage point of the cable 25, so that the winch, cable and skid means can be aligned along the line L of a plate to be cleaned.

These figures also illustrate a variant of linear guide 315, which can be used in association with this embodiment of the system or with any other embodiment. The guide line 315 in particular is movable between an operational position in which it is above the working plane P, and a non-operational position in which it is below. Switching between the two positions is done for example by reclining or telescoping. The operational separation between the machine 305 and the guide line 315, when the bench is not to be cleaned, is achieved by removing the skid means 56 from the guide 315, or more easily by leaving them associated therewith and disconnecting the cable 25 from the skid means 56.

General Interpretation of Terms

In understanding the object of the present invention, the term "comprising" and its derivatives, as used herein, are intended as open-ended terms that specify the presence of declared characteristics, elements, components, groups, integers and/or steps, but do not exclude the presence of other undeclared characteristics, elements, components, groups, integers and/or steps. The above also applies to words, which have similar meanings, such as the terms "comprised", "have" and their derivatives. Furthermore, the terms "part", "section", "portion", "member" or "element" when used in the singular can have the double meaning of a single part or a plurality of parts. As used herein to describe the above executive embodiment(s), the following directional terms "forward", "backward", "above", "under", "vertical", "horizontal", "below" and "transverse", as well as any other similar directional term, refers to the embodiment described in the operating position. Finally, terms of degree, such as "substantially", "about" and "approximately", as used herein, are intended as a reasonable amount of deviation of the modified term such that the final result is not significantly changed.

While only selected embodiments have been chosen to illustrate the present invention, it will be apparent from this description to those skilled in the art that various modifications and variations can be made without departing from the scope of the invention as defined in the appended claims. For example, the size, shape, position or orientation of the various components can be modified as needed and/or desired. The components shown directly connected or in contact with each other can have intermediate structures arranged between them. The functions of one element can be performed by two and vice versa. The structures and functions of one embodiment can be adopted in another embodiment. All the advantages of a particular embodiment do not necessarily have to be present at the same time. Any characteristic that is original compared to the prior art, alone or in combination with other characteristics, should also be considered a separate description of further inventions by the Applicant, including the structural and/or functional concepts embodied by such characteristics. Therefore, the foregoing descriptions of the embodiments according to the present invention are provided for illustrative purposes only and not for the purpose of limiting the invention as defined by the appended claims and the equivalents thereof.

The invention claimed is:

1. System for removing slag from workbenches comprising plates (21) parallel to each other developed in a first main direction L, wherein the system comprises a slag removal machine (5), a traction group (10) of the machine (5), a linear sliding guide (15) for the traction group, wherein said three elements are associated with each other in such a way that: the traction group (10) is operationally interposed between the machine (5) and the guide (15), so as to drag the machine (5) towards the guide (15) along a traction direction L; and the traction group (10) slides at least partially along the guide (15) along a sliding direction W orthogonal to the traction direction L, wherein the slag removal machine comprises tool means suitable for straddling, during said traction, at least one of said plates (21) which is oriented with said first development direction L parallel to said traction direction L; wherein said traction group (10) comprises at least one traction cable (25), at least one winch (50) for winding said cable (25) and skid means (56) for the sliding association of the at least one winch to the linear guide (15); wherein said at least one winch is supported by the machine (5) and said skid means (56) are slidingly supported by the guide (15), the at least one winch (50) and the skid means being connected to each other by the at least one traction cable (25), whereby the at least one winch drags the machine with it towards the skid means placed on the sliding guide.

2. System according to claim 1, wherein said at least one winch is slidingly supported by the sliding guide (15) by means of skid means, and is connected to the machine (5) by means of said at least one traction cable (25) in order to pull the at least one winch to itself.

3. System according to claim 2, characterized in that the at least one winch (50) and the machine (5) are connected to each other by a towing cable (25) and by a control line (52) of motor means (54) of the at least one winch (50), which are simultaneously windable by the at least one winch (50).

4. System according to claim 3, characterized in that the control line supplies motor means (54) of the at least one winch (50), and is in turn supplied by means of a supply line (52b) connected to the machine (5), wherein the at least one winch (50) is controlled by means of controls (51) that are arranged on the machine (5).

5. System according to any one of claim 3, characterized in that the at least one winch (50) comprises at least two reels (55, 60) for simultaneously winding the at least one traction cable (25) of the machine and the control line (52).

6. System of claim 5, characterized in that the reels (55, 60) comprise respective grooved surfaces with respective spiral seats for housing the at least one traction cable (25) and the control line (52) respectively, further the traction group comprises respective shaving elements (68, 69) which during the rotation keep the at least one traction cable (25) and the control line (52) inside the spiral seats (65 and 66), the reels are counter-rotating.

7. System according to claim 2, characterized in that the at least one winch (50) and the machine (5) are connected to each other by a towing cable (25) and the at least one winch (10) is connected to a control line (52) of motor means (54) wherein only the at least one traction cable is wound by the at least one winch (50), while the control line (52) remains outside the at least one winch (50) and connects the at least one winch (50) with a control that is separate from the machine (5).

8. System according to claim 2, characterized in that the at least one winch (50) is connectable and disconnectable to the machine (5) and is reclinable with respect to the linear sliding guide (15).

9. System according to claim 1, characterized in that the traction group (10) has at least one non-operational condition in which the traction machine allows manual unwinding of the at least one traction cable (25) for the manual distancing of the machine (5) in the opposite direction to the towing direction.

10. System according to claim 1, characterized in that the group comprises pneumatic motor means arranged to move at least one reel of the at least one winch to wind said at least one traction cable (25).

11. System according to claim 1, characterized in that the machine (5) comprises a handlebar (43) on which there are:
controls (51) for operating the traction group (10);
controls (48) for operating tool means (35) of the machine (5);
at least one supply connection (49) between at least one supply line external to the system (49, 52b) and the tool means (35); and
at least one supply connection (52b) between at least one external supply line and the traction group (10).

* * * * *